Oct. 24, 1933.  W. P. WHITE  1,931,911
PACKING METHOD AND APPARATUS

Filed Oct. 2, 1929

Inventor:
William P. White,

Patented Oct. 24, 1933

1,931,911

UNITED STATES PATENT OFFICE 1,931,911

PACKING METHOD AND APPARATUS

William P. White, Chicago, Ill., assignor to White Cap Company, Chicago, Ill., a corporation of Delaware Application October 2, 1929. Serial No. 396,822

17 Claims. (Cl. 226—82)

This invention has to do with the preservative packing of foodstuffs and the like in merchantable packages. It possesses particular utility in the packaging of such materials while hot.

A general object of the invention is the provision of an improved process and apparatus which may be employed conveniently in commercial use for the packing of materials in hermetically sealed containers, and which is particularly adapted to facilitate quantity production by virtue of the rapidity with which the material may be packaged, the simplicity of the operations and apparatus involved, and the ease and certainty with which the operations and apparatus may be controlled for the obtaining of uniform results.

A specific object is the provision of a method and apparatus whereby food materials and the like, in liquid form and heated condition, may be suitably packed and sealed for preservation without the disadvantages and complications involved in the packaging of such materials under reduced pressure.

Another specific object is the provision of a method and apparatus for the packaging of foodstuffs and the like in hermetically sealed containers, whereby the sterilization of the head space and container closure may be accomplished incident to the closing and sealing of the container, thus obviating the necessity for subsequent processing of the sealed package.

Yet another object is the provision of a method and apparatus for the packing of materials in hermetically sealed containers which will materially reduce the likelihood of the sealed container's being forced open by internal pressures generated incident to heat processing after sealing.

Yet another specific object is the provision of a method and apparatus for the packaging of materials in containers which are closed by means of frictionally retained caps or closures, which will facilitate the complete and proper seating of the closure in the first instance and contribute to the secure retention of the same and the preservation of the hermetic seal.

A particular object is the provision of a method and apparatus which will facilitate the packaging and sealing of materials in containers in which the head space is reduced incident to the seating and sealing of the closure, and which will contribute to the maintenance of the package in a hermetically sealed condition.

Other and further objects will be pointed out or indicated hereinafter, or will be apparent to one skilled in the art upon an understanding of the invention or its employment in use.

For the purpose of aiding in the disclosure of the invention, I show and describe in this specification and in the drawing forming a part hereof certain apparatus, appliances, and operations which may be employed in the practice of the invention. It is to be understood, however, that these are presented for illustrative purposes only, and are not to be accorded any interpretation calculated to limit the claims short of the true and most comprehensive scope of the invention in the art.

In the drawing

Figure 1:
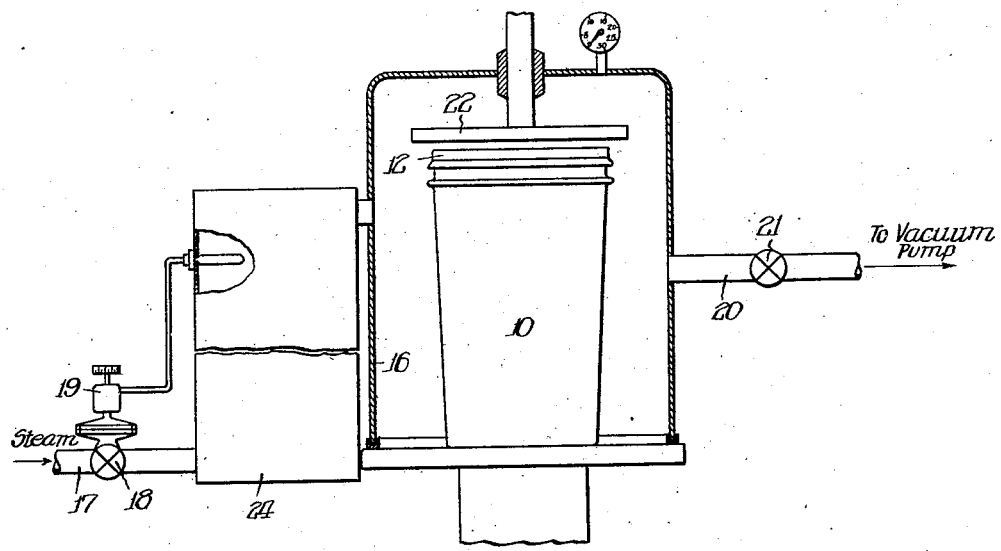
Fig. 1 is a diagrammatic illustration in the nature of a sectional elevation of apparatus which may be employed in the embodiment or practice of the invention.
Figure 2:
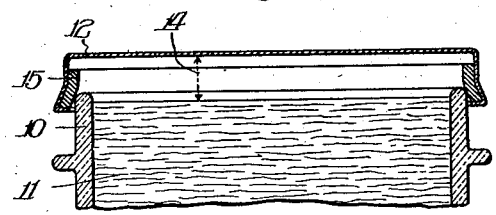
Fig. 2 is a diagrammatic illustration in the nature of a sectional elevation of a top portion of a jelly glass and a closure therefor, as shown in relationship preliminary to the sealing of the closure on the vessel.

It has long been a practice in the packing or packaging of perishable materials, such as foodstuffs, to exhaust as much as possible of the air from within the container preliminary to the final sealing thereof. This has been done for three reasons, viz., to reduce as far as possible the number of micro-organisms and the conditions under which aerobiotic growth and activity may take place in the sealed package, to produce a negative pressure condition within the sealed container for the purpose of minimizing the internal pressure generated by a subsequent heat processing, and to retain the closure in place under external atmospheric pressure. It has also been the practice to subject the sealed packages of perishable materials to heat processing for the purpose of sterilizing them or preventing the growth and activity of destructive micro-organisms which may have been sealed in the package. In the packing of some materials, advantages are gained in packing and sealing them while hot. In materials which are liquid while hot, or containing a considerable proportion of liquids, such as jellies and jams, the evacuating and sealing of the containers are complicated by the possibility of the hot material's being caused to froth or boil when the air pressure is reduced in the vacuumizing operation preliminary to the seating and sealing of the closure. This is likely to cause the formation of bubbles in the body of the material, the presence of which, when the container is transparent, undesirably affects the appearance of the package. Moreover, if some of the material is boiled out onto the container surface portions on which the seal is to be made, it may render it difficult to effect a sterile sealing of the package. While it has been desirable to draw as high a vacuum as possible on the package, conditions of plant operation render it extremely difficult to maintain at all times and under all conditions the certainty and accuracy of control which will obtain the highest possible vacuum without causing the boiling of the hot material. Such products as jellies and jams, when packed on a commercial scale, are now customarily packed in jars or tumblers which are closed by caps or covers hermetically sealed thereon by means of some sort of plastic or compressible gasket and retained in place by friction or by external air pressure, or both. When such packages which have been sealed under insufficient negative pressure are subsequently subjected to heat processing, there is likelihood of the closure's being forced off by internal pressures before sufficient heat has been applied to effect the requisite sterilization. Consequently, the art is forced to resort to various complicated arrangements of apparatus for carrying on and controlling the processing.

The present invention provides a method and apparatus whereby materials may be sealed in containers while hot and while under sub-atmospheric pressure with the possibility of completely and automatically preventing ebullition, and whereby the air content and the head space in the container may be reduced to a minimum and the surfaces of the material, container and closure exposed in said head space given the requisite sterilizing treatment incident to closing of the package.

Described generally, the invention contemplates the packing of the material at a suitable temperature in a container which is adapted to be hermetically sealed by the application of a closure. The filled container, together with its closure, which has not yet been sealed upon it, but which may rest loosely upon it in condition for sealing, are placed in a heated vapor, such as steam, which is at a vapor pressure slightly above that of the material. For purpose of distinction I shall refer to this vapor as the "control" vapor. From considerations of convenience, the filling of the container and the placing of it in the control vapor may be done at atmospheric pressure, although the control vapor must be at a temperature whereat its absolute vapor pressure is below atmospheric pressure. With the container and its surrounding control vapor suitably enclosed against ingress of air, as in the receiver of an air pump, the pressure effective upon the material in the container is reduced mechanically, as by means of an air pump, to the point where it is equal to the absolute vapor pressure or tension of the control vapor at its prevailing temperature. The air within the container having been at atmospheric pressure at the time it was placed in the control vapor, some of such air will be thus withdrawn from within the container by the reduction of pressure outside it. By having the control vapor at a pressure only slightly above that of the material in the container, the reduction of the actual pressure within the receiver to the absolute pressure of the control vapor will bring the pressure on the material within the container down to a point approximating its own vapor pressure. This will result in quick vaporization of some of the material to the point where an equilibrium is established between it and the vapor in the head space of the container, and the vapor so produced from the material will displace the air from the head space, being aided in this by the reduced pressure outside the container. Boiling of the material is definitely and automatically prevented by maintaining the control vapor temperature constant, thus preventing the pressure upon the material being reduced to a value below that of the tension of the control vapor. Thus there is established a condition wherein the pressure on the material has been reduced to that of the control vapor, and the air within the container has been displaced by vapor at that pressure. In this condition the closure is sealed on the container. If the volume of the head space within the container is reduced incident to the seating and sealing of the closure, the compression of the enclosed vapor will cause it to condense, without increasing the pressure in the container. Thus the container is actually sealed under an effective pressure less than atmospheric pressure, and upon the cooling, which takes place after its removal from the control vapor, the internal pressure in the package will be still further reduced by the shrinkage of the material and condensation of the confined vapor.

Figure 3:
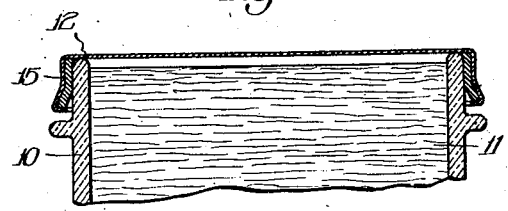
Fig. 3 is a similar diagrammatic illustration illustrating the relationship of parts after the closure has been seated and hermetically sealed on the vessel.

A more detailed understanding of the invention may be had by reference to a specific example, for illustration of which I refer to the accompanying drawing. The reference numeral 10 designates a glass tumbler of a sort in which jelly is customarily packed. This is filled with the hot cooked jelly liquid 11, brimful if desired. Assume, for example, that the jelly liquid is at a temperature of 180° F., which temperature is sufficiently high to kill the microorganisms, such as yeasts and molds, which are to be guarded against in the preservation of a material of this kind. A closure cap 12 is placed loosely on top of the vessel, leaving an air space 14 between the top of the cap and surface of the liquid. This cap is adapted to be seated and sealed on the vessel by being pressed downwardly thereon, whereby the rubber gasket 15 is compressed tightly between the skirt of the cap and the outer side wall of the vessel to form a hermetic seal and retain the cap on the vessel by friction. The package is placed under a suitable bell 16, which is filled with steam at an average temperature of say 182° F., same being supplied from the line 17 through a valve 18 which is controlled by a thermostatic device 19 in such fashion that the temperature of the steam in the bell will be maintained approximately constant. The bell is connected to a vacuum pump by means of the line 20 controlled by the valve 21. The volumetric capacity of the vacuum pump is such that if the bell were filled with air instead of steam, the pump could evacuate it to a maximum practical limit almost instantaneously. The bell carries a vertically movable sealing head 22 which may be pressed down to force the closure 12 to seated position on the vessel 10. The filled vessel, with its contents which are at a temperature of about 180° F., being thus placed in the steam filled bell, the latter is closed against ingress of air. The valve 21 is opened to establish communication between the interior of the bell and the vacuum pump, and the pump quickly reduces the pressure in the bell to that corresponding to the vapor pressure of the steam at 182° F., which is about eight pounds per square inch absolute. No matter what the volumetric capacity of the air pump, and its capacity should be high in order to obtain quick action, it cannot reduce the pressure within the bell below that corresponding to the regulated temperature of the steam, as upon drop of the pressure below that value, and the resulting drop in steam temperature, the temperature responsive regulator 19 will admit more steam in amount sufficient to maintain the temperature, and hence the pressure of the steam, at the value for which it is set. Due to the presence of a considerable proportion of free moisture in the steam and condensation on the bell, the steam remains saturated. The reduction of pressure within the bell withdraws air from the head space 14 under the container cap, the loose contact of the cap on the vessel permitting this, and also reduces the vapor pressure upon the surface of the jelly liquid to a point very close to the vapor pressure of the liquid itself. As a result of such withdrawal of air from contact with the jelly liquid and such reduction of the vapor pressure upon the liquid, evaporation of the liquid is promoted to the extent that the head space becomes quickly filled with vapor of a pressure corresponding to that of the steam. This is accomplished without producing ebullition in the liquid, for, as pointed out above, the vapor pressure cannot be reduced below that of the steam at the temperature of 182° F., and hence cannot be reduced to the vapor pressure of the jelly liquid at 180° F. A condition having been established, therefore, wherein the head space has been exhausted of air and filled with vapor, the sealing device 22 is operated to press the closure down onto the vessel to the relationship shown in Fig. 3 to form the hermetic seal. The reduction of the head space accomplished by this seating of the closure compresses vapor confined in the package, resulting in its condensation. The sealed package is then removed from the bell, and, with the shrinkage of the contents as it cools, the negative pressure within the container is further increased.

It will be understood from the foregoing that by the procedure described, the package may be sealed under sub-atmospheric pressure corresponding approximately to the vapor pressure of the liquid and representing the minimum pressure that can be employed without causing the liquid to boil; and it is further to be observed that the control is so absolute and definite that boiling of the package contents is positively precluded even under conditions of most rapid operation. Because of these circumstances, therefore, it is possible to employ a vacuum pump of large volumetric capacity and thus accomplish the sealing operation in a very short time without complicated control apparatus.

The process possesses a further very important advantage in that by employment of suitable temperatures the sterilizing of the head space and closure may be accomplished in the course of the exhausting and sealing operations, thus obviating the necessity for further heat processing of the sealed package. In the packing of jellies and jams, for example, and other products which contain a considerable proportion of free acid, the organisms to be dealt with are molds and ferments which may be killed or disabled by a temperature upwards of 160° F. The material itself is adequately sterilized in the cooking and will sterilize the container when poured into it at such temperatures. Consequent upon the withdrawal of the air from the head space, it is rendered possible to sterilize the head space and the surfaces therein exposed, by the heat of the steam in which the package is sealed and of the material in the package and of the vapor therefrom, in the short time that the package is undergoing the evacuating and sealing operations.

It will be apparent from the foregoing that the actual control factors in the process are the vapor pressure of the material which is being packed and the vapor pressure of the control vapor. Since the vapor pressures are functions of the temperatures of the respective substances, definite control may be exercised by suitable regulation of the temperature of the material and the temperature of the control vapor, and consequently it is possible to work with only a very small differential between the vapor pressures of the two substances, with entire safety and assurance against boiling of the material. In materials such as jellies and jams, which contain a substantial proportion of sugar, the boiling point is somewhat higher than that of water at a given pressure, and, as a consequence, with such materials it is possible to operate with steam at a temperature very close to that of the material. In operation with steam, a double safeguard against boiling the material is afforded, for in addition to the thermal control of the steam supply, the presence of free moisture in the steam supplies a resource which automatically prevents reduction of the effective pressure in the bell to the point where ebullition will be produced in the material. This free moisture, being carried in the steam in a very finely divided and extensively diffused state, will approximate the temperature of the steam, and hence will pass to the vaporous condition as the effective pressure approaches the value which would admit of ebullition in the material, and by such vaporization will retard the drop of the vapor pressure and thus compensate for any slight lag in the response of the thermic regulating device. It is a very simple matter to definitely control the temperature of the material as of the time that it is subjected to the exhausting and sealing operations, by regulation of its temperature when placed in the container. Such regulation involves simply maintaining a constant temperature in the batch from which the container is filled, and commercial filling machines are now equipped to do that.

The apparatus required in the commercial practice of the process is relatively simple and susceptible of rapid and accurate operation and is thus capable of large output. The vacuum pump and the steam valve and thermostatic regulator all may be of standard commercial types, and access to the bell for introduction and removal of the package may be afforded either by a relative vertical movement of the bell and package supporting table, or by a movable side closure on the bell. The relief of the negative pressure in the bell, to permit the opening thereof, may be accomplished conveniently by having the valve 21 a two-way valve which at one adjustment will establish communication between the bell and atmosphere and at the other adjustment between the bell and the vacuum pump. In order that there may be a sufficient volume of control vapor at all times available to supply the requirements in the bell, it may be desirable to employ between the bell and the vapor control valve 18, a vapor reservoir 24 in direct communication with the bell, the thermic control device being arranged to maintain this reservoir filled with vapor at the requisite temperature. In the copending application of myself and Clifford E. Ives, for Exhausting and sealing machines, Serial No. 309,540, filed October 1, 1928, is disclosed a type of machine which, by addition of the steam supply and control elements, may be easily and appropriately adapted to the practice of the present process.

It is to be understood that the terms "sterilize" and "sterilizing temperature" are not used herein in their absolute sense, but are used to indicate effects and temperatures whereby the micro-organic decomposition of the particular material packed is prevented in the absence of re-inoculation.

What I claim is:

1. A method of packing perishable material which comprises placing the material in a container, confining a heated vapor in contact with the material, reducing the pressure on the material to that of the vapor tension of the vapor, and sealing the container under that condition.

2. A method of packaging which comprises subjecting heated material in a packing container to contact with a saturated vapor of higher temperature, reducing the actual pressure on the material to the value of the vapor tension of said vapor, and sealing the container under that condition.

3. A method of packaging which comprises placing heated vaporizable material in a container under atmospheric pressure, confining in contact with the material a heated atmosphere having a vapor tension slightly higher than that of the material, reducing the actual pressure on the material to a value corresponding to the vapor tension of said confined atmosphere, and sealing the container under that condition.

4. A method of packaging vaporizable material which comprises sealing it in a container while maintaining in contact with it a vapor at absolute pressure only slightly higher than the vapor tension of the material.

5. A method of packaging vaporizable material which comprises subjecting the material while in a packing container and at an elevated temperature below its boiling point to the pressure conditions of a heated vapor under atmospheric pressure, said vapor having a vapor pressure only slightly greater than that of the heated material, reducing the effective pressure on the material to that of the vapor pressure of the vapor, and sealing the container under that condition.

6. A method of packaging material in sealed containers which comprises placing the material in a container, enveloping the mouth of the container in a vapor under atmospheric pressure, reducing the pressure effective on the material to the vapor pressure of the vapor, and sealing the container.

7. A method of packaging which comprises confining an unsealed package in a receiver, supplying a heated vapor to the receiver, exhausting the effective pressure in the receiver to the absolute pressure of the vapor, and sealing the package under the latter pressure.

8. A method of packaging which comprises placing an unsealed package in communication with a receiver at atmospheric pressure, supplying a heated vapor to the receiver, maintaining the temperature of the vapor in the receiver constant, reducing the effective pressure in the receiver to a value below atmospheric pressure, and sealing the package under the reduced pressure.

9. A method of packaging which comprises placing the unsealed package in a receiver at atmospheric pressure, supplying a heated vapor to the receiver, regulating the temperature of the vapor in the receiver to constancy, reducing the effective pressure in the receiver to the vapor pressure of the vapor, and sealing the package under the reduced pressure.

10. A method of packaging which comprises placing an unsealed package of heated material in a receiver, supplying a vapor to the receiver, regulating the temperature of the vapor in the receiver to a value whereat the vapor pressure of said vapor is slightly higher than that of the material, reducing the effective pressure in the receiver to the minimum permitted by the vapor, and sealing the package under the reduced pressure.

11. A method of packaging heated liquid, which comprises placing a container of heated liquid within a receiver at atmospheric pressure, supplying a heated vapor to the receiver, maintaining the vapor pressure of the vapor at a value slightly above that of the liquid, reducing the effective pressure in the receiver as far as permitted by the vapor, and sealing the container under the reduced pressure.

12. A method of packaging hot liquid-containing material, which comprises placing a container of the hot material in a receiver at atmospheric pressure, supplying a vapor to the receiver at a sterilizing temperature, regulating the temperature of the vapor to constancy, reducing the effective pressure in the receiver to the vapor pressure of the vapor, and sealing the container at the reduced pressure.

13. A method of packaging jelly and the like, which comprises placing in a receiver a container of jelly liquid at a sterilizing temperature together with a closure for the container, supplying to the receiver a vapor at a sterilizing temperature, regulating the temperature of the vapor to a value whereat its vapor pressure is slightly greater than that of the jelly liquid, reducing the effective pressure in the receiver to the vapor pressure of the vapor, and sealing the closure on the container at the reduced pressure.

14. A method of packaging perishable material, which comprises placing the material in a packing container, disposing a closure loosely on the container, placing the container and closure in a receiver, supplying a vapor to the receiver at a sterilizing temperature, regulating the temperature of the vapor to maintain its vapor pressure slightly above that of the material, reducing the effective pressure in the receiver to a value corresponding to the vapor pressure of the vapor, and sealing the closure on the container at the reduced pressure.

15. Packing apparatus comprising, in combination, a receiver, an air pump operably connected therewith, means for supplying vapor to the receiver, means for regulating the temperature of vapor in the receiver, and means for sealing a package in the receiver.

16. Packing apparatus comprising, in combination, a receiver, an air pump operably connected therewith, means for supplying vapor to the receiver, means for regulating to constancy the vapor pressure of the vapor in the receiver, and means for sealing a package in vapor in the receiver.

17. In an exhausting and sealing machine, in combination, a receiver adapted to receive a package, an exhaust pump operably connected with the receiver, means for supplying saturated vapor to the receiver, means for regulating to constancy the temperature of the vapor in the receiver, and sealing means operable upon a package in the receiver.

WILLIAM P. WHITE.